(12) United States Patent
Yamamoto et al.

(10) Patent No.: US 7,581,981 B2
(45) Date of Patent: Sep. 1, 2009

(54) ELECTRICAL JUNCTION BOX FITTING DEVICE

(75) Inventors: Tetsuya Yamamoto, Shizuoka (JP); Masatoshi Egawa, Shizuoka (JP); Keiichi Ito, Aichi (JP); Yoshihide Tsukamoto, Aichi (JP); Masanori Wakui, Aichi (JP); Isao Yoneyama, Aichi (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/554,548

(22) PCT Filed: Apr. 23, 2004

(86) PCT No.: PCT/JP2004/005899

§ 371 (c)(1),
(2), (4) Date: Oct. 24, 2006

(87) PCT Pub. No.: WO2004/096610

PCT Pub. Date: Nov. 11, 2004

(65) Prior Publication Data

US 2007/0042636 A1 Feb. 22, 2007

(30) Foreign Application Priority Data

Apr. 28, 2003 (JP) ............................. 2003-123317

(51) Int. Cl.
*H01R 13/58* (2006.01)
(52) U.S. Cl. ...................................................... 439/475
(58) Field of Classification Search ................. 439/475, 439/382, 474, 801, 34, 383, 384, 809, 811, 439/791, 76.2, 923; 174/58, 535, 50, 50.54, 174/52.1
See application file for complete search history.

(56) References Cited

U.S. PATENT DOCUMENTS

| 6,206,718 | B1 * | 3/2001 | Takahashi et al. ........... 439/382 |
| 2002/0061677 | A1 * | 5/2002 | Iwata ......................... 439/475 |
| 2005/0056447 | A1 * | 3/2005 | Nakamura et al. ............ 174/58 |

FOREIGN PATENT DOCUMENTS

| DE | 197 07 421 | 9/1998 |
| EP | 1 323 590 | 4/2006 |
| JP | 2000-232716 | 8/2000 |
| JP | 2000-305331 | 12/2000 |

(Continued)

OTHER PUBLICATIONS

Communication from Chinese Patent Office dated Feb. 1, 2008 (5 pages).

*Primary Examiner*—Edwin A. Leon
(74) *Attorney, Agent, or Firm*—Kratz, Quintos & Hanson, LLP (57) ABSTRACT

An electrical junction box has a fitting member for securing the junction box to a vehicle body. The fitting member has a breakdown accelerating portion for enhancing breakdown of the fitting member when the junction box is pulled to remove it from the vehicle body. The breakdown accelerating portion is positioned in a base side of the fitting piece. By a transverse force caused by pulling an associated wiring harness, the breakdown accelerating portion initiates breakdown of a bracket to separate the junction box from the bracket. Another fitting device has a fitting member formed on a junction box for securing the junction box to a vehicle body. The fitting member has a slot for enhancing breakdown of the fitting member when the junction box is pulled to remove the junction box from the vehicle body, and the fitting member has a compensating piece removably inserted into the slot for adjusting the breakdown of the fitting member.

3 Claims, 6 Drawing Sheets

FOREIGN PATENT DOCUMENTS

| | | |
|---|---|---|
| JP | 2001-078330 | 3/2001 |
| JP | 2001-78330 | 3/2001 |
| JP | 2003-061223 | 2/2003 |
| JP | 2003-61223 | 2/2003 |
| JP | 2003-70123 | 3/2003 |
| JP | 2003-070123 | 3/2003 |

* cited by examiner

ELECTRICAL JUNCTION BOX FITTING DEVICE

BACKGROUND OF THE INVENTION

1. Field of the Invention

The present invention relates to a fitting device of an electrical junction box that is mounted on a panel of a vehicle body. The fitting device is useful for recovery of the junction box together with a wiring harness connected to the junction box.

2. Related Art

Figure 9:
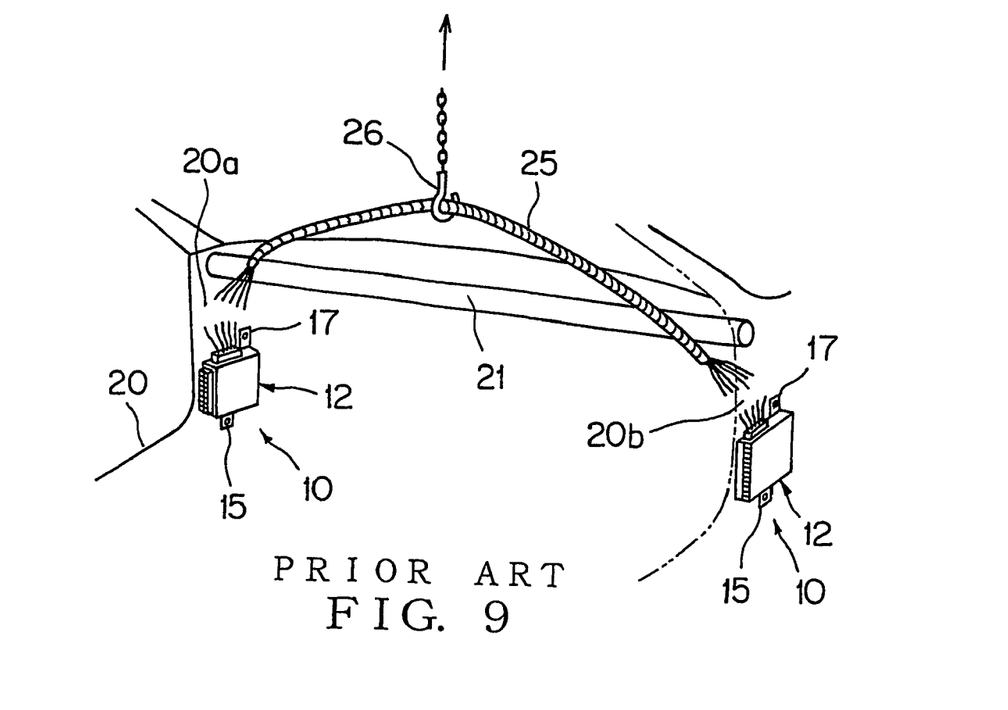
FIG. 9 is a perspective view showing a conventional art for recovery of junction blocks secured on vehicle panels, in which a wiring harness has been broken by a tensile force exerted on a J-hook at a recovery step of the junction blocks.

An automobile vehicle has a lot of wiring harnesses (electrical cables) arranged therein. The wiring harnesses are connected to junction blocks (junction boxes), relay blocks, connector blocks, an ECU box, protectors, etc. The components are secured to a vehicle panel. For example, as illustrated in FIG. 9, a junction block 10 is secured on a side panel 20a of with fixing screws (not shown) while another junction block 10 is secured on a side panel 20b with fixing screws (not shown). The junction blocks 10 are electrically connected to each other via a wiring harness 25 that is arranged along a reinforcing bar 21.

In a preliminary scraping process of the vehicle where recycled parts are specifically removed for recycling thereof, a J-shaped hook 26 hangs the wiring harness 25 to pull the junction blocks 10 upward to recover the junction blocks 10.

However, the pulling force via the J-shaped hook 26 causes breakdown of the wiring harness 25 or disconnection of connectors mounted on the junction blocks 10, while the junction blocks 10 remain on the panels 20. Because, the junction blocks 10 has been firmly secured on the panels with fixing screws to prevent disengagement of the junction blocks 10 due to vibrating forces during running of the vehicle.

The remaining junction blocks 10 take an additional time to remove it from the panel for recovering thereof. Because, a worker must release the fixing screws passing through brackets 15 and 17 with an impact wrench or the like. The worker needs to bend his body for the recovery process of the junction blocks 10.

To solve such problems, the applicant of this patent application proposed a fitting device of an electrical junction box (junction block) secured to a vehicle body panel. The fitting device of the junction box is improved such that the removal of the junction box becomes easy. The fitting structure is disclosed in Japanese Patent Application Laid-open No. 2000-350331 (pages 2, 3 and FIG. 3).

The junction block has a main body 54 and a bracket 50 (FIG. 10) fitted on the main body 54. The main body 54 accommodates fuses and relays, and the bracket 50 is secured on a panel of the vehicle body. The bracket 50 is a tongue extending from a side surface of the main body 54 and secured on the vehicle panel with fixing screws.

Figure 10:
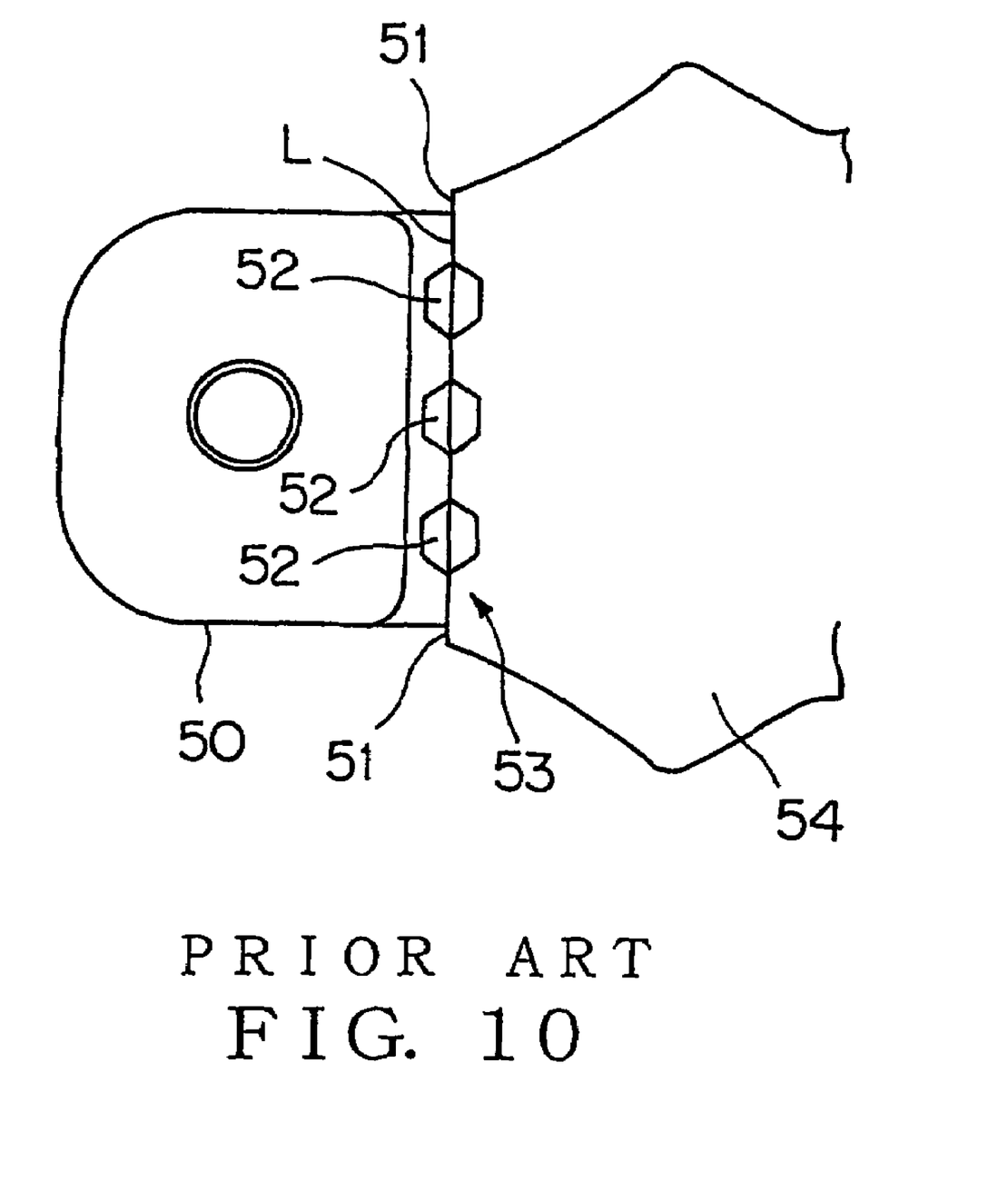
FIG. 10 is a plan view showing a conventional fitting device formed on the junction block.

The bracket 50 is formed with a breakdown accelerating portion 53, which has a step 51 and a plurality of breaking holes 52 that are positioned along a line L aligned with the step 51. The breakdown accelerating portion 53 has a sectional area smaller than the other part of the bracket 50, causing stress concentration in the breakdown accelerating portion 53 so that a small external force can break the breakdown accelerating portion 53 to separate the main body 54 from the bracket 50.

An external force exerted on the junction block causes a crack in the breakdown accelerating portion 53 of the bracket 50, and the crack runs along the line L passing the step 51 and the breaking hole 52. This allows recovery of the main body 54 without breakdown of the main body 54.

However, the conventional fitting device has a disadvantage to be solved as discussed hereinafter.

A vibration or impact force generated during running of a vehicle is exerted on the breakdown accelerating portion 53, which may disadvantageously break the accelerating portion 53. The breakdown of the accelerating portion 53 may cause the junction block to be removed from the vehicle panel so that the junction block is brought in an unstable hanged state. The junction block may become in a non-connection state by disconnection of connectors of the junction block, or the junction block itself may be broken by abutment against the vehicle panel.

SUMMARY OF THE INVENTION

In view of the disadvantage, an object of the invention is to provide a fitting device of an electrical junction box that is improved in workability of recovery and in quality of recycle. The fitting device is not broken by vibration or impact generated during running of a vehicle but can be broken to be separated from the junction box only on a recovery step of the junction box itself.

To achieve the object, an aspect of the invention is a fitting device of an electrical junction box. A fitting member is formed on the junction box for securing the junction box to a vehicle body. The fitting member has a breakdown accelerating portion for enhancing breakdown of the fitting member when the junction box is pulled to remove the junction box from the vehicle body. Preferably, the breakdown accelerating portion is positioned in a base side of the fitting piece.

This structure keeps a sufficient strength against vibration or impact (vertical force) generated during running of a vehicle but can be easily broken to be separated from the junction box by a transverse force (horizontal force) on a recovery step of the junction box itself. That is, the transverse force provided by pulling an associated wiring harness causes stress concentration in the breakdown accelerating portion, initiating a crack in the breakdown accelerating portion to separate the junction box from fitting piece.

Preferably, the breakdown accelerating portion is a notch that is provided at least one side of the fitting member. The notch deceases a sectional area of the fitting piece, causing stress concentration due to a tensile or twisting force in a transverse direction of the vehicle. When the notch is provided in each side of the fitting piece, a greater stress concentration is achieved to enhance breakdown of the fitting piece.

A second aspect of the invention is a fitting device of an electrical junction box. A fitting member is formed on the junction box for securing the junction box to a vehicle body. The fitting member has a slot for enhancing breakdown of the fitting member when the junction box is pulled to remove the junction box from the vehicle body, and the fitting member has a compensating piece removably inserted into the slot for adjusting the breakdown of the fitting member.

When the compensating piece has been received in the slot, the increased solidity of the fitting piece prevents breakdown of the fitting piece against vibration or impact generated during running of the vehicle. On the contrary, when the compensating piece has been drawn out from the slot, the solidity decrease of the fitting piece can easily break the fitting piece by a tensile or torsion force in a transverse direction of the vehicle. On a recovery step of the junction box, the fitting piece easily breaks down to improve workability of the recovery step.

Preferably, the fitting member has a breakdown accelerating portion for further enhancing breakdown of the fitting member. A transverse force caused by pulling an associated wiring harness initiates a crack in the breakdown accelerating portion to separate the junction box from fitting piece with ease.

A third aspect of the invention is a fitting device of an electrical junction box. The fitting device has at least a pair of resilient pieces fitted on a vehicle body for resiliently securing the junction box to the vehicle body such that the junction box can be pulled to remove the junction box from the vehicle body.

Thus, the resilient pieces absorb an external force caused by vibration or impact during running of the vehicle, preventing disengagement of the junction box body from the vehicle. On the contrary, the junction box body can be easily removed from the resilient pieces to recover the junction box from the vehicle. On a recovery step of the junction box body, the junction box body can be released from the panel 20 by stretching the resilient pieces outward to separate the junction box body from the resilient pieces to improve workability of the recovery step. Furthermore, removal and remounting of the junction box on the vehicle can be done by a single step.

Preferably, the resilient piece is received in a positioning recess engaging with the resilient piece. Thus, the engagement of the resilient piece with the recess positions the junction box at a predetermined location and prevents deviation of the junction box against vibration of the vehicle to surely secure the junction box on the vehicle.

DETAILED DESCRIPTION OF THE PREFERRED EMBODIMENTS

Referring to the accompanied drawings, embodiments of the present invention will be discussed in detail hereinafter.

FIGS. 1 to 4 show a first embodiment of a fitting device of an electrical junction box according to the present invention. Note that the same reference numeral as that of the conventional one is applied to a component the same as that of the conventional art.

Figure 1:
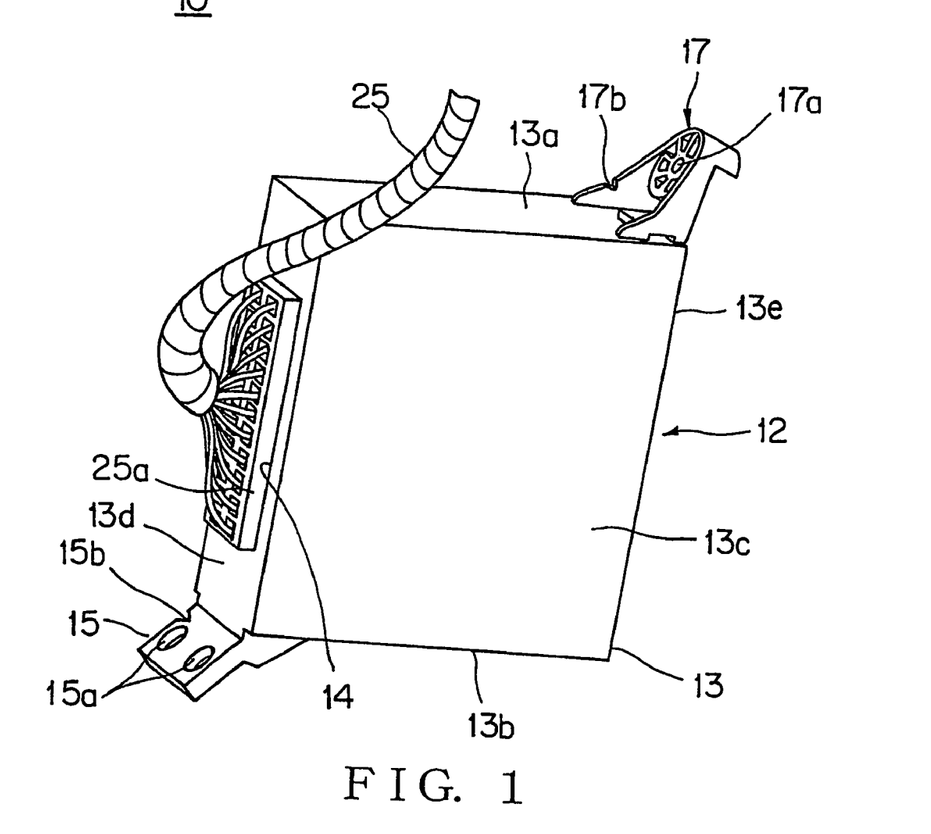
FIG. 1 is a perspective view showing a first embodiment of a fitting device of an electrical junction box (junction block) according to present invention.

A junction block 10, which is an electrical junction box, is a vehicle component accommodating a branch circuit unit having busbars and conductors. The junction block 10 is secured on a panel 20 (vehicle body side) in an engine room or a cabin of a vehicle such as a car with fasteners like screws.

Figure 4A:
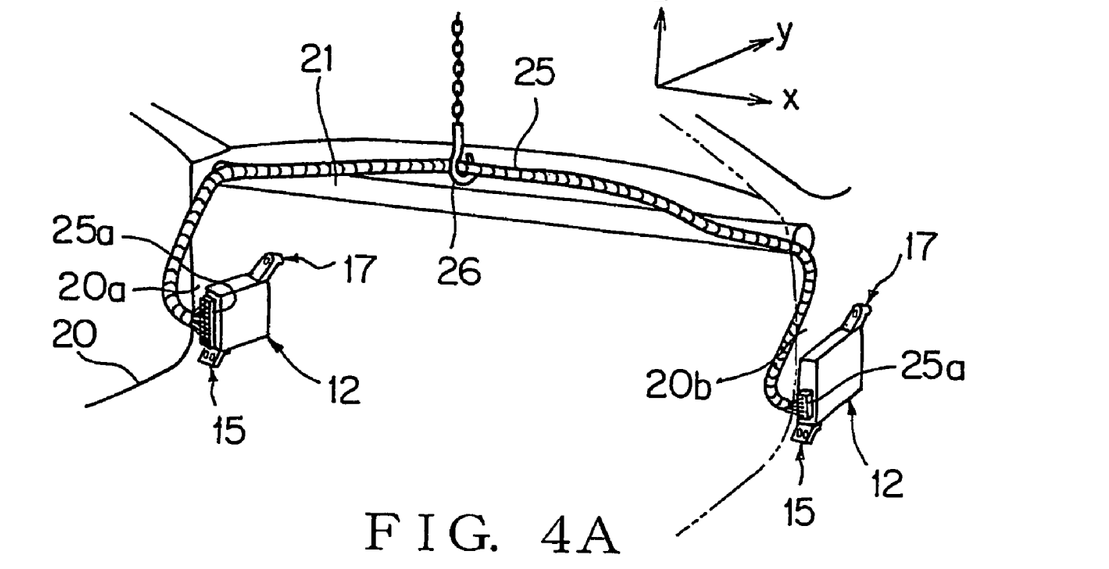
FIGS. 4A and 4B are respectively a perspective view showing a recovery step of the junction block, FIG. 4A showing a wiring harness hanged by a J-shaped hook, FIG. 4B showing the wiring harness pulled upward together with the junction boxes.
Figure 4B:
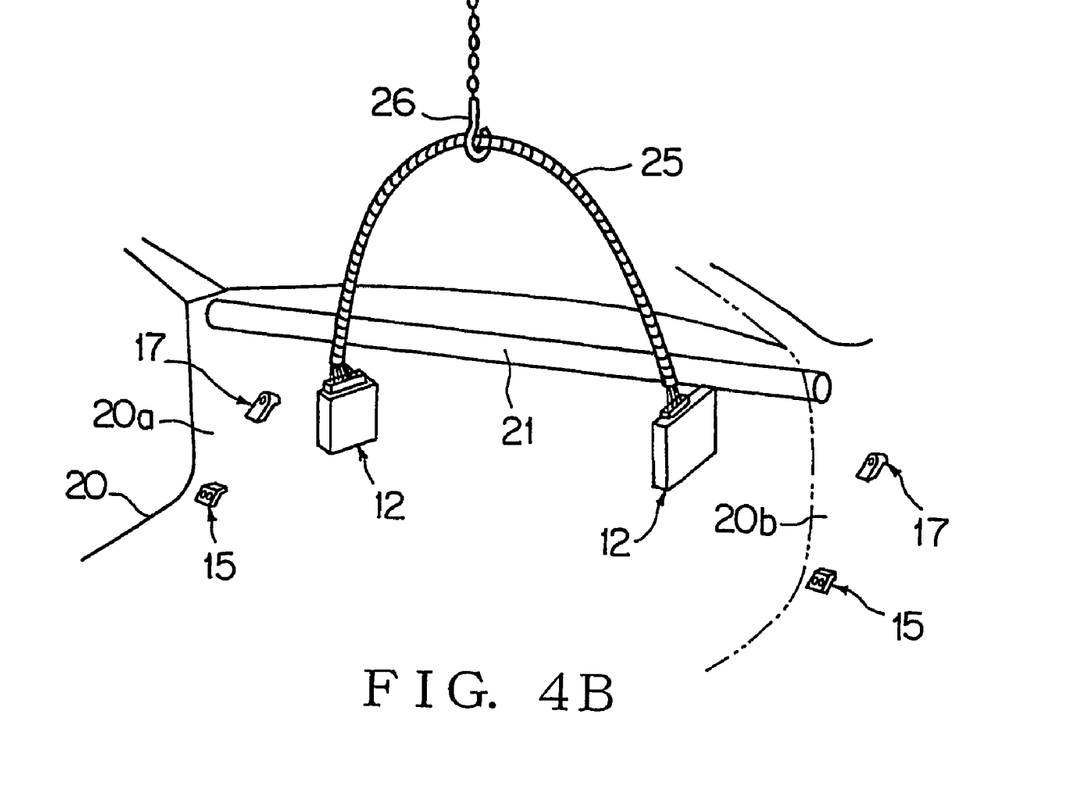

The junction block 10 of the embodiment has brackets (fitting piece) 15, 17 each projected from a top wall 13a or a bottom wall 13b of a block body 12. The block body 12 is secured to a panel 20 via the brackets 15, 17. Each of the brackets 15, 17 has a notch 15b or 17b for enhancing breaking at a base portion thereof. On a recovery step of the block body 12, a wiring harness 25 is pulled in a transverse direction x (FIG. 4A) so that the notch 15b or 17b initiates breakdown of the bracket 15 or 17 to separate the block body 12 from the brackets 15, 17. Thereby, the block body 12 is recovered together with the wiring harness 25 (FIG. 4B).

However, the brackets 15, 17 breaks only when the wiring harness 25 is pulled in the transverse direction x and does not break by an external force directed in a longitudinal direction y or a vertical direction z (FIG. 4A) of the vehicle. This maintains reliable electrical connection of the block body 12 during running of the vehicle.

Next, primary components of the junction block 10 and operational effects thereof will be discussed in detail. As shown in FIG. 1, The junction block 10 has the block body 12 of a rectangular box and the brackets 15, 17 for fitting the block body 12 to the panel 20. The junction box is not limited in the junction block 10 but may be a relay block, a connector block, an ECU box, a protector, or the like.

The block body 12 has a case 13, a circuit unit (not shown) accommodated in the case 13, and a wiring harness 25 led from the case 13. The case 13 is formed by injection molding from a synthetic resin material. The case 13 has a rear wall 13d formed with a female connector engagement portion 14 engaging with a connector 25a provided at one end of the wiring harness 25. The connector 25a is locked to the connector engagement portion 14 with a locking device to prevent disengagement of the connector 25a from the connector engagement portion 14 when the wiring harness 25 is pulled.

The wiring harness 25 has a strength that prevents its breakdown against a pulling force on recovering of the block body 12. In other words, a breakdown strength of the brackets 15, 17 is smaller than that of the wiring harness 25. Thus, the wiring harness 25 does not break before the block body 12 is separated from the brackets 15, 17 by breakdown of the brackets when the wiring harness 25 is pulled.

Meanwhile, the brackets 15, 17 are firmly secured on the panel 20 so that the brackets 15, 17 do not break off from the panel 20 even when the wiring harness 25 is pulled by a force strong enough to break the wiring harness 25. For example, the brackets 15, 17 are secured to the panel 20 with fasteners such as screws, bolts, clamps, etc.

Each of the brackets 15, 17 is extended from a top wall 13a or a bottom wall 13b of the block body 12. The brackets 15, 17 each have a profile to fit with an associated portion of the panel 20. The brackets 15, 17 each are formed with a through hole 15a or 17a to receive a fixing screw.

Figure 2:
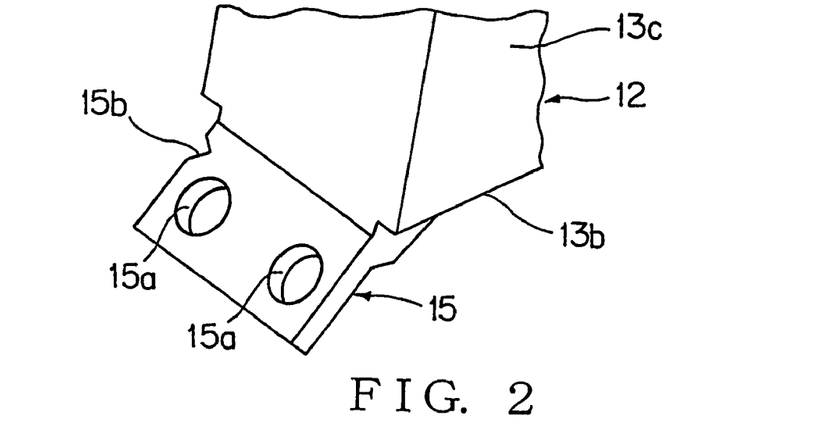
FIG. 2 is an enlarged perspective view showing a lower fitting piece of the junction block of FIG. 1.

As shown in FIG. 2, the first bracket 15 projects from one end of the bottom wall 13b of the block body 12 along a diagonal direction of a rectangular side wall 13c of the block body 12 to be defined in a tongue shape. The first bracket 15 has a width almost equal to that of the block body 12 between the side walls 13c. The first bracket 15 is formed with two parallel through holes 15a receiving the fixing screws.

Figure 3:
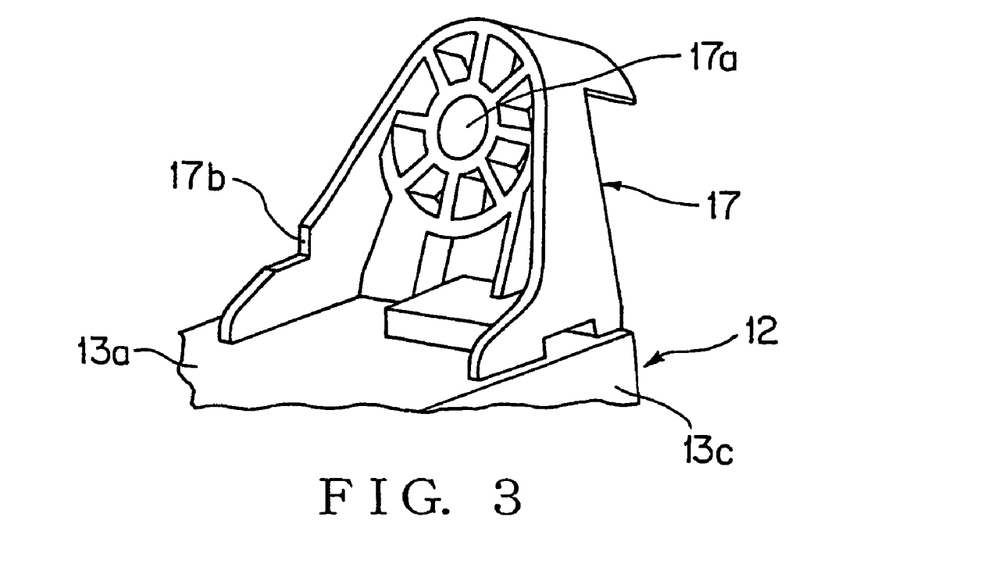
FIG. 3 is an enlarged perspective view showing an upper fitting piece of the junction block of FIG. 1.

As shown in FIG. 3, the second bracket 17 projects from one end of the top wall 13a of the block body 12 diagonally upward. The second bracket 17 defines a U-shape. The second bracket 17 is positioned diagonally to the first bracket 15 relative to the block body 12. The second bracket 17 has a width almost equal to that of the block body 12 between the side walls 13c as well as the first bracket 15. The second bracket 17 is formed with a through hole 17a at its central position for receiving a fixing screw.

The first and second brackets 15, 17 have respectively a notch 15b or 17b for cutting off the block body 12 from the brackets 15, 17 on a recovery step of the block body 12. The notch 15b or 17b may be provided in each side of the bracket 15 or 17, which reduces a sectional area of the bracket to increase its stress concentration, enhancing breakdown of the bracket.

Only one of the notches 15b, 17b may be provided, in which the notch is formed in one of the brackets 15, 17 which receives a tensile force on a recovery step of the block body 12. Because, the notch enhances breaking of the bracket when it receives a tensile force.

The notch 15b or 17b is formed in a V-shape. However, in the present invention, the notch may be formed in a U-shape, a rectangle, a semi-circle, a channel, or a groove. Such a notch may be provided at each side of the bracket 15 or 17.

Next, how to secure the block body 12 on the panel 20 will be discussed. As shown in FIG. 4A, the panel 20 is secured on side portions 20a, 20b of the panel 20 via the first and second brackets 15, 17. The through holes 15a, 17a of the brackets 15, 17 receive fixing screws that engage with threaded holes of the panel 20 to secure the block body 12 on the panel 20. The wiring harness 25 arranged along the reinforcing bar 21 and connected to be block body 12 via the connector 25a is pulled upward.

As shown in FIG. 4B, on a recovery step of the block body 12, a J-hook 26 hangs the wiring harness 25 arranged along the reinforcing bar 21, and the J-hook 26 is moved upward. Thereby, the block body 12 is pulled in a transverse direction of the vehicle, so that the bracket 15 breaks and then the other bracket 17 breaks. The block bodies 12 are moved upward together with the wiring harness 25.

As mentioned above about the embodiment, the block body 12 secured on the vehicle body breaks off only by a tensile force in a transverse direction x of the vehicle and does not break off by an unintentional external force caused by vibration or impact during running of the vehicle in a longitudinal direction y or a vertical direction z of the vehicle.

Figure 5:
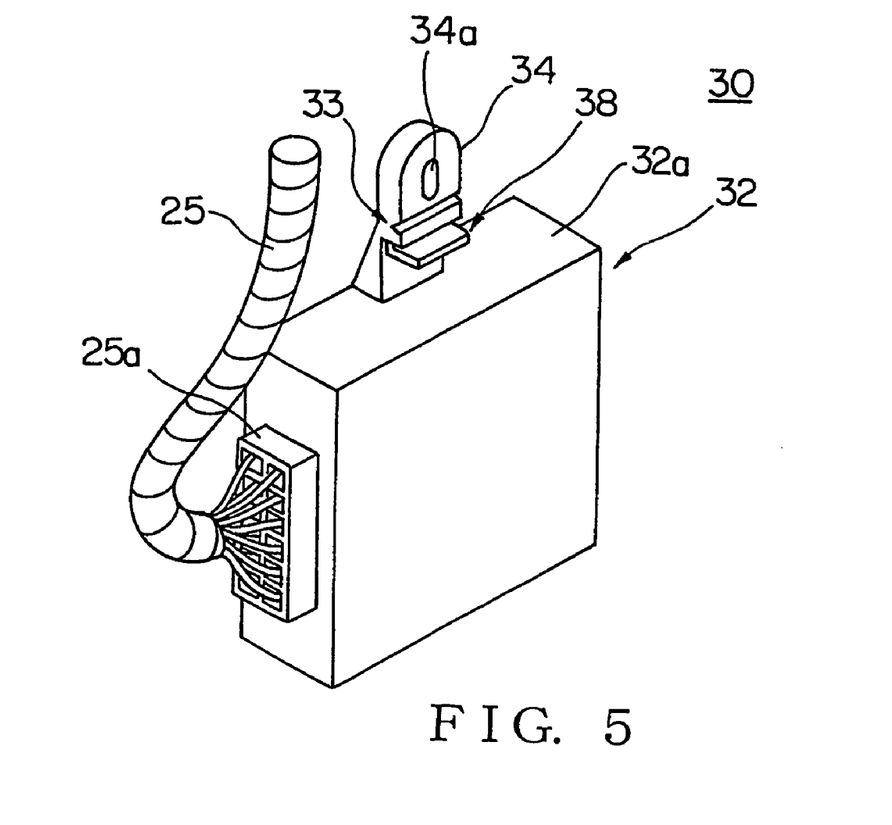
FIG. 5 is a perspective view showing a second embodiment of a fitting device of an electrical junction box (junction block) according to present invention.
Figures 6A, 6B:
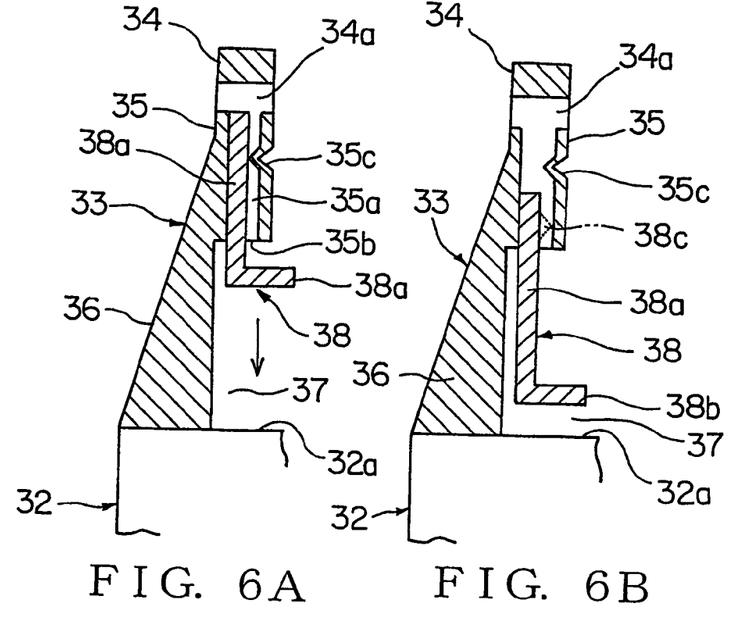
FIGS. 6A and 6B are respectively an enlarged sectional view showing primary parts of the junction block of FIG. 5, FIG. 6A showing a compensating piece having been inserted into a slot of a bracket, FIG. 6B showing the compensating piece having been drawn out from the slot.

Referring to FIGS. 5 and 6, a second embodiment of a fitting device of an electrical junction box according to the present invention will be discussed. A component the same as that of the first embodiment is designated by the same reference numeral of the first embodiment.

The second embodiment has a bracket 33 different from the brackets 15, 17 of the first embodiment. The bracket 33 has a slot 35a receiving a compensating piece 38. The bracket 33, which has received the compensating piece 38 in the slot 35a, has a larger moment of inertia of its sectional area to increase solidity of the bracket 33 to prevent breakdown of the bracket 33 due to an external force such as vibration and impact during running of the vehicle. On the contrary, when the compensating piece 38 is drawn out from the slot 35a, the bracket 33 decreases in solidity so that the bracket 33 can be broken by a force in a transverse direction x of the vehicle.

The bracket 33 is a tongue unitarily formed with a block main body 32 and extended upward from a central portion of a top wall 32a of the block body 32. The bracket 33 has a central through hole 34a for inserting a bolt or the like.

The bracket 33 has a head 34 secured on the panel 20 (FIG. 4A), a joining base 36 contiguous with the block body 32, and a middle portion 35 positioned between the head 34 and the joining base 36. The head 34 and the middle portion 35 define an elongated semicircular shape, at a center of which there is provided a through hole 34a. Inside the middle portion 35, there is formed a slot 35a extending from a head portion to a bottom of the middle portion 35. The bottom of the slot 35a has an opening 35b (FIG. 6A).

As shown in FIGS. 6A and 6B, a rear side portion of the middle portion 35 is contiguous with the joining base 36. The joining base 36 has a section generally of a right triangle and a bottom contiguous with the top wall 32a of the block body 32. The middle portion 35 is positioned generally in a fore side of the middle portion 35. Between the bottom of the middle portion 35 and the top wall 32a of the block body 32, there is a space 37 for drawing in and out the compensating piece 38. The height of the space 37 is determined to be a little longer than the compensating piece 38.

The middle portion 35 is formed with a dent 35c for accelerating breakdown of the bracket 33. The dent 35c initiates the breakdown only when the block body 32 receives a tensile force in a transverse direction x (FIG. 4A) of the vehicle. The dent 35c does not work during running of the vehicle or during mounting of the wiring harness 25.

The dent 35c may have an any shape to initiate breakdown of the bracket 33. The dent 35c may be defined in a V-shape as shown in FIG. 6A or may be in a U-shape, a rectangle, or a semi-circle.

The compensating piece 38 is made of a metal such as steel and is removably inserted into the slot 35a of the bracket 33 to be held in a pinched state. The compensating piece 38 is defined in an L-shape but may be a flat plate or any shape for preventing breakdown of the bracket 33.

The compensating piece 38 of the embodiment has an elongated portion 38a that is held in the slot 35a and has a short rib 38b projected from the elongated portion 38a. The short rib 38b is positioned outside the slot 35 so as to move the compensating piece 38. For example, as shown by dotted lines of FIG. 6B, a protrusion rib 38c may be provided for engagement with a rear surface of the dent 35c.

On a recovery step of the block body 32, the rib 38b of the compensating piece 38 is pulled downward to draw out the compensating piece 38, and a J-hook 26 is used to hang the wiring harness 25 to move the block body 32 upward for separating the block body 32 from the panel 20 by a force directed in a transverse direction x of the vehicle as well as the first embodiment shown in FIG. 4A.

In the second embodiment, the bracket 33 has the breakdown accelerating dent 35c, the slot 35a, and the compensating piece 38 removably inserted into the slot 35a. Thereby, the breakdown of the bracket 33 is surely prevented against an external force due to vibration or impact during running of the vehicle. On a recovery step of the block body 32, the drawing-out of the compensating piece 38 decreases solidity of the bracket 33 so that the bracket 33 can be broken off by a force directed to the transverse direction x.

Figure 7:
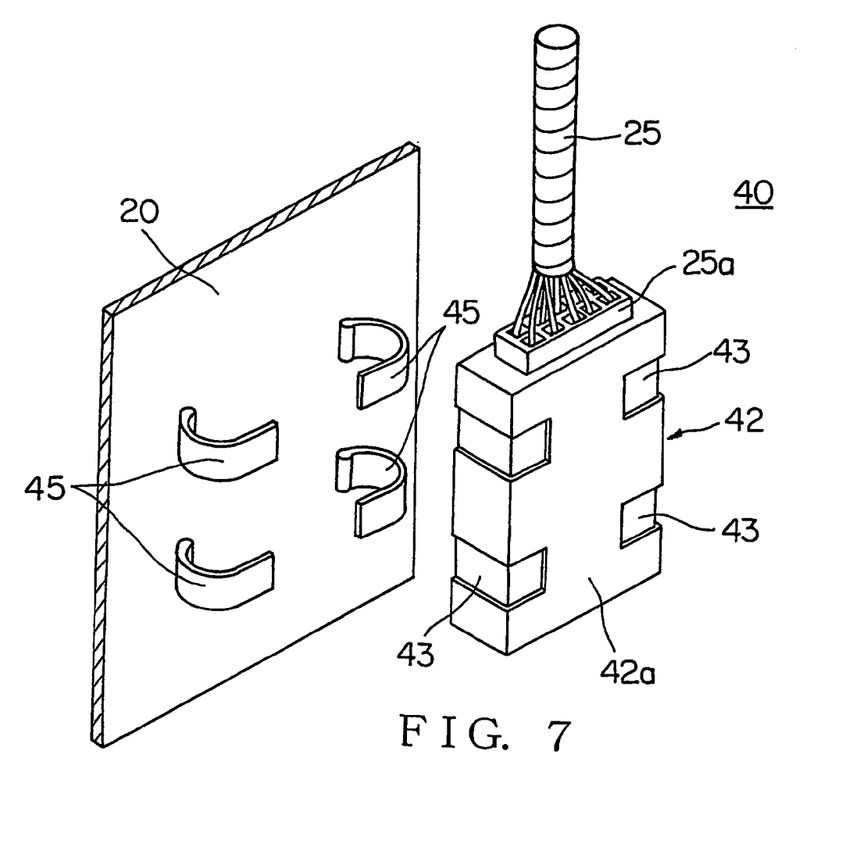
FIG. 7 is a perspective view showing a third embodiment of a fitting device of an electrical junction box (junction block) according to present invention.
Figure 8:
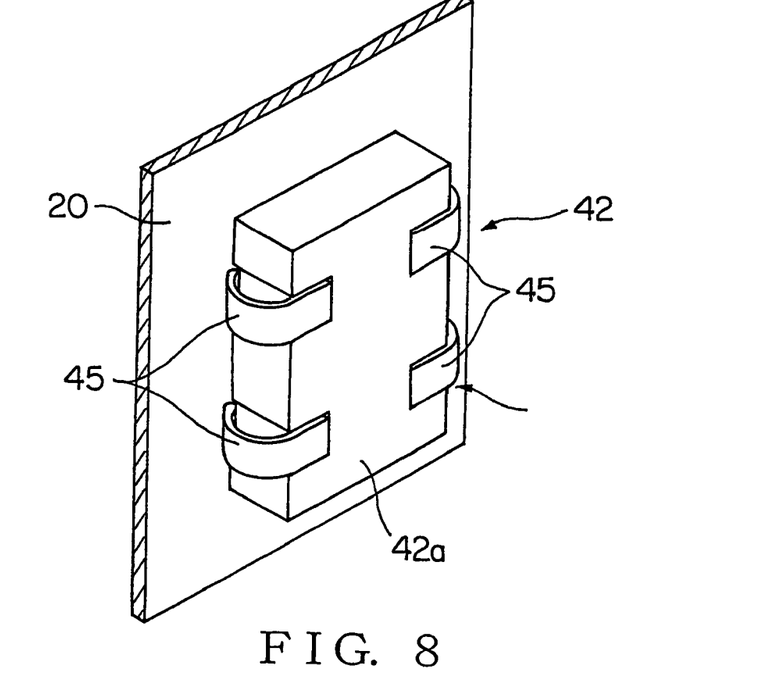
FIG. 8 is a perspective view showing a state where the junction block has been secured on a vehicle panel.

Referring to FIGS. 7 and 8, a third embodiment of a fitting device of an electrical junction box according to the present invention will be discussed. A component the same as that of the first embodiment is designated by the same reference numeral of the first embodiment.

The third embodiment is different from the first embodiment in that a block body 42 is directly fitted on the panel 20 without a bracket. A pair of resilient pieces 45 are provided to extend from the panel 20 at upper and lower parts of the block body 42. The two pairs of resilient pieces 45 pinch and hold the block body 42 by the resilient forces of the resilient pieces 45 to secure the block body 42 on the panel 20. Each resilient piece 45 is formed in a U-shape by bending a rectangular metal plate in an elongated direction thereof.

Since the resilient pieces 45 resiliently hold the block body 42, the resilient pieces 45 absorb an external force due to vibration or impact during running of the vehicle, preventing the block body 42 from disengagement from the panel 20. Furthermore, on a recovery step of the block body 42, the block body 42 can be easily removed from the panel 20 by stretching the resilient pieces 45 outward.

The resilient piece 45 is not limited in the U-shape but may be any form such as an L-shape for pinching and holding the block body 42. The pair of resilient pieces 45 may align with or may be offset from each other. The resilient pieces 45 may be positioned so as to surround the block body 42.

The block body 42 has a peripheral wall 42*a* formed with shallow recesses 43 positioned to be opposed to the resilient pieces 45. Each shallow recess 43 is formed in a L-shape across two walls perpendicular to each other of the block body 42. The resilient pieces 45 engage with the shallow recesses 43 to position the block body 42 and to surely secure it on the panel 20, preventing deviation of the block body 42 during running of the vehicle.

On a recovery step of the block body 42, in the same way as the first embodiment of FIG. 4A, a J-hook 26 is used to hang the wiring harness 25 to move the block body 42 upward for separating the block body 42 from the panel 20 by a force directed in a transverse direction x of the vehicle.

In the third embodiment, on a recovery step of the block body 42, the block body 42 can be released from the panel 20 by stretching the resilient pieces 45 outward to separate the block body 42 from the panel 20.

The present invention is not limited in the embodiments described above but can be embodied in various modifications based on the present invention.

The invention claimed is:

1. A fitting device of an electrical junction box comprising:
a fitting member formed on the junction box for securing the junction box to a vehicle body, wherein the fitting member has a top, bottom and sides, with the bottom being directly secured against the vehicle body and has a breakdown accelerating portion for enhancing breakdown of the fitting member when the junction box is pulled to remove the junction box from the vehicle body, wherein the breakdown accelerating portion is a notch that is provided on at least one side of the fitting member.

2. A fitting device of an electrical junction box comprising:
a fitting member formed on the junction box for securing the junction box to a vehicle body, wherein the fitting member has a slot and a breakdown accelerating portion along the slot for enhancing breakdown of the fitting member when the junction box is pulled to remove the junction box from the vehicle body, and the fitting member has a compensating piece removably inserted into the slot for adjusting a force required for breakdown of the fitting member at the breakdown accelerating portion.

3. The fitting device according to claim 2 wherein the breakdown accelerating portion is a notch that is provided along the slot at least on one side of the fitting member.

* * * * *